United States Patent
Fruge' et al.

(10) Patent No.: US 6,407,879 B1
(45) Date of Patent: Jun. 18, 2002

(54) DISK DRIVE COVER FEATURES FOR SPINDLE RESONANCE TUNING AND DAMPING

(75) Inventors: Tave J. Fruge', Louisville, CO (US); Andrew J. Hudson, Mountain View, CA (US); Mathew J. Sandor, Boulder; Kris D. Schneider, Louisville, both of CO (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 09/158,743

(22) Filed: Sep. 22, 1998

(51) Int. Cl.[7] .................................................. G11B 33/14

(52) U.S. Cl. .................................................. 360/97.02

(58) Field of Search ............................ 360/97.01, 97.02

(56) References Cited

U.S. PATENT DOCUMENTS

| | | | | |
|---|---|---|---|---|
| 5,004,207 A | * | 4/1991 | Ishikawa et al. | 360/97.02 X |
| 5,725,931 A | * | 3/1998 | Landin et al. | 360/97.02 X |
| 5,757,580 A | * | 5/1998 | Andress et al. | 360/97.02 |
| 5,790,344 A | * | 8/1998 | Allen | 360/97.02 |
| 5,875,067 A | * | 2/1999 | Morris et al. | 360/97.01 |
| 5,898,537 A | * | 4/1999 | Oizumi et al. | 360/97.01 |
| 6,081,406 A | * | 6/2000 | Morris et al. | 360/97.01 |

* cited by examiner

Primary Examiner—William J Klimowicz
(74) Attorney, Agent, or Firm—David M. Sigmond

(57) ABSTRACT

A disk drive having spindle resonance tuning and damping for improved disk drive performance. The disk drive has slots in the top cover which reduces rocking resonant frequency of the spindle to allow a previously interacting spindle to no longer interact. A constrained-layer damper can be added over the top cover to dampen existing or interacting frequencies which can further improve performance.

55 Claims, 8 Drawing Sheets

$w_1 = r_2 - r_1$
$w_2 = r_4 - r_3$

| Motor Type 5400 RPM | Cover Type | Damping Material | Amplitude of Lower Dynamic Rocking Mode (mHz) | Percent Change | Amplitude of Upper Dynamic Rocking Mode (mHz) | Percent Change |
|---|---|---|---|---|---|---|
| Nidec 8 ball | Solid | None | 426 mHz | | 264 mHz | |
| Nidec 8 ball | 2 Slot | Avery | 173 | 59.4% | 89 | 66.3% |
| Nidec 8 ball | 2 Slot | 3M | 171 | 59.9% | 95 | 64.1% |
| Nidec 8 ball | 3 Slot | Avery | 168 | 60.6% | 88 | 66.6% |
| PMDM 10 ball | Solid | None | 666 | | 165 | |
| PMDM 10 ball | 2 Slot | Avery | 246 | 63.1% | 75 | 55.5% |

*Fig. 9*

DISK DRIVE COVER FEATURES FOR SPINDLE RESONANCE TUNING AND DAMPING

FIELD OF THE INVENTION

The present invention relates to a cover for a hard disk drive which dampens rocking motion of the spindle motor, reduces the motion of the recording head relative to the disk, decreases the transmission of mechanical vibration from the spindle motor to the top cover and reduces acoustical emissions.

BACKGROUND OF THE INVENTION

Hard disk drives are used in personal computer applications for the high volume storage of data. These drives contain a disk assembly and a head arrangement for transferring data to and from tracks disposed concentrically on one or more disk surfaces. The disks are mounted to a bearing spindle hub which is rotatable around an inner stationary shaft. A motor is typically mounted within or beneath the hub and rotates the disks and hub.

Three modes of vibration may occur in a spinning disk and hub assembly. The first mode of vibration for the disk and hub is in a radial direction relative to the spindle shaft. The second mode of vibration for the disk and hub is in an axial direction relative to the spindle shaft. The third mode of vibration is a rocking displacement of the disk and hub relative to the spindle shaft. Consequently, vibrational energy transmitted to the spindle-disk assembly may cause servo systems errors and track misregistration, thereby decreasing drive performance.

The vibrations occur for several reasons. A first reason is a result of spindle generated vibrations from ball bearing defects as the bearing spins during operation. A ball bearing is not perfectly spherical and generally contains some defect such as a flat spot, crevice or the like. Consequently, the movement of the spindle as the bearing passes each defect produces an excitation which generates vibration in a spindle. With several bearings defect frequencies associated with each spindle speed, a multitude of ball bearing excitation frequencies will produce vibrations in any given spindle design. A second reason is a result of environmental vibrations or shock. Sources of environmental induced vibrations include but are not limited to physical jarring of the disk drive installed in a computer, or any movement to a computer. A third reason is a result of vertical diaphragm vibrations of the head-disk assembly transferred to the spindle-disk assembly. The diaphragm mode vibrations are vertical drum-like deformations of the top cover and bottom base plate of a head disk assembly enclosure.

In addition to the foregoing described vibrations, every given spindle structure inherently has an upper and lower rocking mode as a result of its design in combination with manufacturing tolerances among its component parts, including the structural stiffness of the disk drive housing. Thus, any given spindle will exhibit specific upper and lower natural rocking resonances, which resonance or frequency will change depending upon the number of disks supported by the spindle, as well as the rotational speed of the disks. Moreover, the rocking resonance can also be excited by the bearing defect frequency (e.g., the number of cycles or number of regular passes of a defected bearing portion in a given amount of time) if the frequency of the natural rocking mode and the bearing defect frequency are close to each other. Just like every manufactured spindle is unique, every bearing design has a unique set of bearing defect frequencies based on the geometry of the bearing and the speed at which the bearings spin. As a result, an abnormally large radial vibration of the spindle will be produced when the bearing defect frequency is the same as or close to the natural rocking mode or frequency of the spindle and disk combination, i.e., the upper and lower rocking modes.

The rocking resonance of the spindle and the overall vibration induced into the spindle-disk combination is further affected by the stiffness of the disk drive housing. Typically, the spindle is positioned between the base plate and cover of the disk drive housing. The stiffness and damping of the base plate and cover can alter and/or dampen the natural rocking resonance of the spindle and the overall vibration of the spindle-disk combination. Disk drives with rigid shafts mounted to rigid housings offer minimum damping to attenuate the effects of spindle rocking mode and vertical diaphragm mode resonances caused by environmental shocks and vibrations, and spindle generated excitations from bearing defects, nor does such rigidity shift or alter the natural rocking resonance away from the bearing defect frequency.

The spindle-disk assembly structure also has a significant effect on the amplitude of vibrations resulting from spindle rocking mode and vertical diaphragm mode resonant frequencies. The amplitude of these vibrations is directly associated with drive performance. Undamped structures exhibit vibrations of higher amplitude at their resonant frequencies, compared to equivalent structures which contain damping, and thus are more likely to effect servo positioning and track registration. Consequently, for a given vibrational input from a source such as spindle bearing defects, an undamped and rigid disk drive housing containing the spindle-disk assembly will produce larger amplitude vibrations in the spindle at its resonant frequency than an equivalent disk drive housing containing damping.

Interaction between the rocking mode frequency and the bearing defect frequency creates a large non repetitive run out (e.g., movement of the spindle-disk in the radial direction) in the spindle causing large amounts of repetitive run out if it occurs during servo write, and large amounts of non repetitive run out if it occurs when the drive is in operation. These results will cause increased position error between the recording head and the data tracks resulting in reduced track following capability. This, in turn, can lead to servo system failure resulting in increased track misregistration, perhaps to the point of producing a non-functional drive, and/or, at a minimum generation of acoustic noise.

Where a common spindle structure is utilized for drives containing, for example, from one to four disks, and operated at two different speeds, there are 16 upper and lower dynamic rocking mode frequencies, and two distinct sets of defect frequencies, creating a large number of interactions between the rocking mode and bearing defect frequencies which need to be avoided. With different spindle vendors using different bearings with different geometries, there exists numerous additional opportunities for the bearing defect frequency and rocking mode frequency interactions to occur. Thus, given the variety of bearing geometries and spindle designs available, and the need to keep the structural stiffliess of the drive housing high for external shock and vibration considerations, it is virtually impossible to avoid all frequency interactions with a single common spindle design. Thus, disk drive manufacturers are required to inventory a large variety of different spindles, to accommodate multiple disk drive platforms and performance standards in their overall product line.

It would be useful to find a way to modify the structural stiffness of a spindle to avoid or dampen generating vibrations due to natural rocking resonance and/or interactions of bearing defect frequencies, to shift the frequencies exhibited by natural rocking modes to prevent overlap with bearing defect frequencies, to accommodate differing effects resulting from varying the number of disks supported by a spindle, variations in the rotational speed of a spindle and various types of bearings, and to avoid and/or dampen the affect of vibration overall. One way is to modify the internal construction of the spindle to change the stiffness and thereby alter the rocking mode resonance to a non-interacting frequency. U.S. Pat. No. 5,483,397 to Gifford et al. discloses first and second viscoelastic dampers effective in attenuating vibrations during operation of a disk drive for improved disk drive performance. The first viscoelastic damper is inserted on top of the spindle shaft and in contact with the top cover of the disk enclosure. The damper has a layer of viscoelastic material fixed to one side of a washer which is effective to attach the washer to the top cover of the disk enclosure. The washer also has an opening at a raised central region to provide access for the attachment of the top cover and the shaft. The second viscoelastic damper is positioned outside the disk enclosure in contact with the bottom baseplate. It is constructed of a polyester layer disposed between first and second viscoelastic layers.

Further, low acoustic noise is an increasingly important performance advantage in the application of hard disk drives. For example, hard disk drives designed to operate in personal computers are used in relatively quiet environments. It has been found that a major source of acoustic noise is the excitation of the spindle-disk assembly during normal operation.

This prior art has several disadvantages. First, an additional mechanical component must be added to the disk drive assembly to attenuate vibrations during operation of the disk drive. This adds cost to the manufacturing of the disk drive. Second, the additional mechanical component decreases system reliability as there exists another component subject to mis-assembly or failure. Third, this prior art can increase head offsets (relative alignments of heads and disks down the spindle) over time and temperature extremes due to spindle movement because the spindle is not rigidly attached to the cover.

The present invention allows for tuning the structural stiffness of a spindle in a disk drive, to avoid and/or dampen rocking motion of the spindle motor.

SUMMARY OF THE INVENTION

A preferred embodiment containing principles of the present invention allows for tuning the structural stiffness of a spindle in a disk drive to reduce vibration, including the rocking mode resonance of a disk drive spindle either alone or when excited or enhanced by a complementary bearing defect frequency. Modification to the disk drive cover in the area of the spindle, in accordance with the principles of the present invention, will reduce the amplitude and/or alter the frequency of the natural rocking resonance mode of the spindle sufficiently either to prevent a previously interacting spindle to no longer interact at a particular bearing defect frequency or to dampen the amplitude of the rocking resonant mode, the bearing defect and overlapping combinative effects of both to reduce the effects of vibrations. This is accomplished by altering the stiffness or spring rate of the disk drive cover or by adding damping. With reductions of the in-plane stiffness of the disk drive cover, substantial reductions or shifting of rocking mode frequency may be accomplished, and vibration is eliminated or substantially reduced.

One embodiment consists of a series of slots in the top cover, extending radially outwardly from the area of the cover to which the spindle attaches. The design allows increased lateral motion of the spindle shaft by facilitating movement in the plane of the cover. The slots change the top cover from a homogenous stiff in-plane material, to a series of relatively weaker beams which flex yet contain no directional stiffness dependency. By modifying the length, spacing, width, and configuration of the slots, varying amounts of stiffness reductions are available. In this manner, the cover can tune the spindle resonance to avoid interaction with the bearing defect frequency, or to dampen any vibrations resulting from the rocking resonance mode or bearing defects, alone or combined.

In a second embodiment, circumferential slots are overlaid by a constrained-layer damper which sits in a pocket formed by a raised portion around the perimeter of the top cover. This acts to reduce the motion of the spindle shaft by absorbing energy. Consequently, the combination of a cover having slots allowing for more spindle shaft motion and the constrained-layer damper, changes the spring rate of the top cover and adds further damping to the rotating spindle-disk assembly. Thus, this embodiment is useful in avoiding an undesirable interaction with the bearing defect frequency and in further damping any interaction that may occur. The implementation of this embodiment has been shown to have attained greater than a 50 percent reduction in peak amplitude associated with rocking mode resonance significantly reducing position error.

A third embodiment consists of a series of spiral slots in the top cover, extending outward from the area of the cover to which the spindle attaches. Like the prior embodiments, the design alters the top cover from a homogenous stiff in-place material, to a series of relatively weaker beams which flex more easily. In this manner, the natural rocking mode resonance can be altered or shifted away from the bearing defect frequency to avoid overlap and negative interaction. While a damping material may also be incorporated, the damping effects are not as pronounced as in the other described embodiments.

It is an object of the present invention to reduce the deleterious effects of vibration and acoustic noise in a disk drive.

It is an object of the present invention to alter or reduce rocking mode resonance and acoustic noise by changing the natural frequency of the spindle.

It is an object of the present invention to eliminate the interaction between bearing defect frequency and rocking mode resonance.

It is another object of the invention to provide a disk drive with increased spindle resonance design flexibility by improving the adjustability of the stiffness of the disk drive housing.

It is another object of the present invention to provide a flexible top cover which reduces spindle vibration.

It is another object of the invention to dampen vibrations in a disk drive.

It is a further object of the invention to provide a disk drive that reduces parts counts and costs.

It is another object of the invention to improve disk drive reliability by eliminating mechanical components, reducing servo system failure resulting in write-to-write and writeto-read track misregistrations, and decreasing position error between the recording head and data tracks resulting in reduced track following capability.

These and other objects of this invention will become apparent from the following drawings and description.

BRIEF DESCRIPTION OF THE DRAWINGS

FIG. 9 is a table showing the relative amplitudes of signals produced by disk drive spin motors incorporating different embodiments of the present invention, compared to solid covers.

DESCRIPTION OF THE PREFERRED EMBODIMENT OF THE INVENTION

Figure 1:
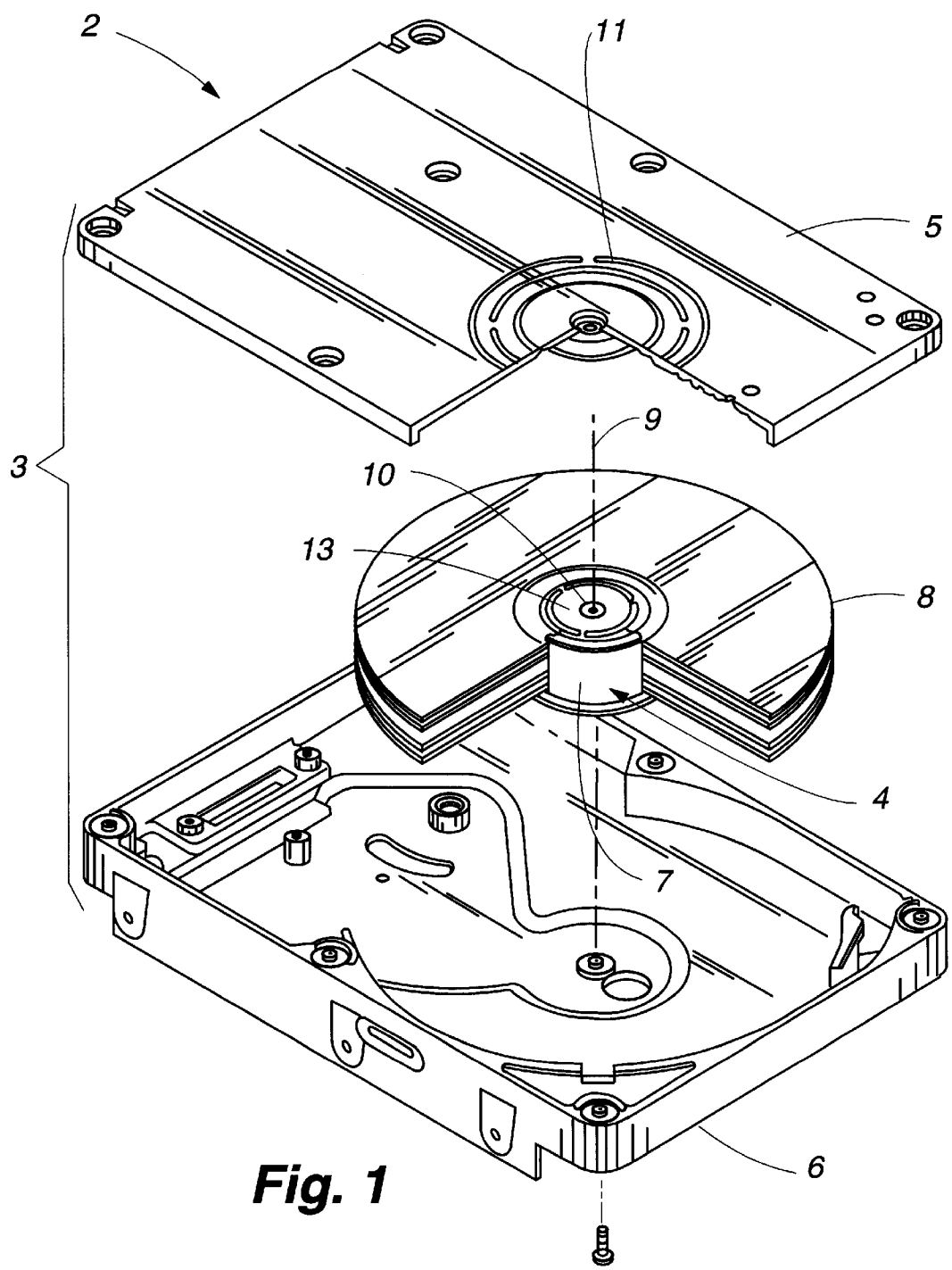
FIG. 1 is an exploded perspective view of a disk drive.
Figure 4:
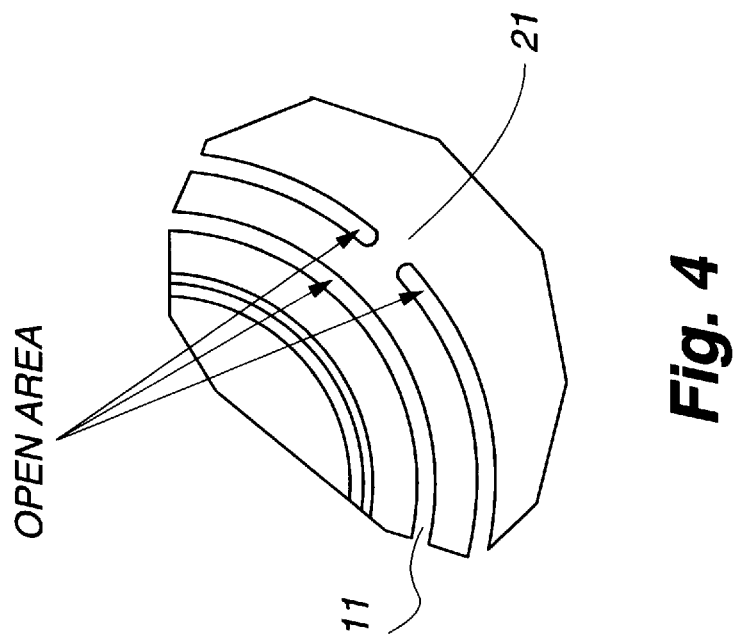
FIG. 4 is an enlarged partial top view of the first embodiment of a top cover.
Figure 2:
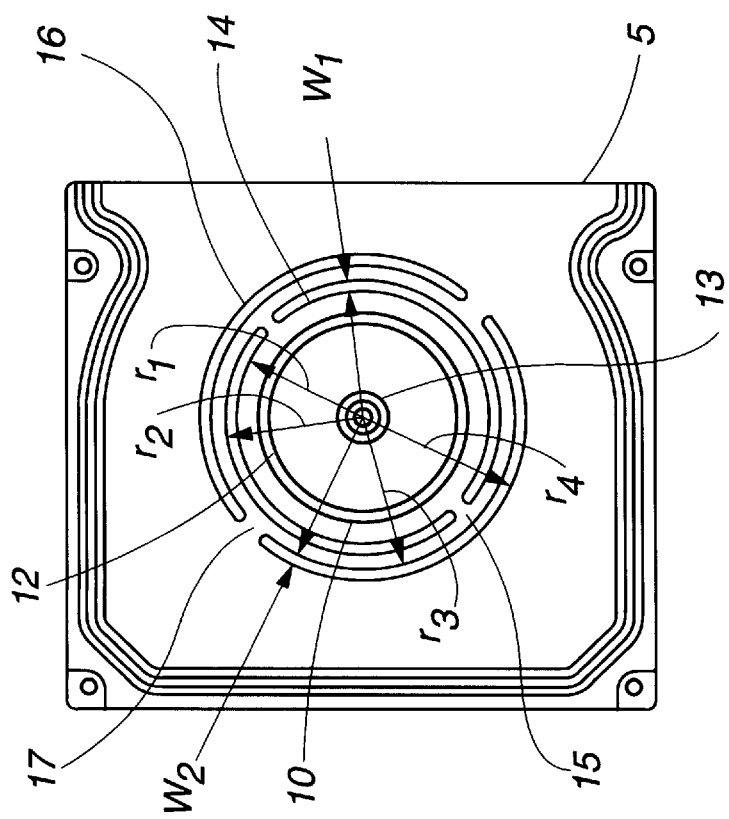
FIG. 2 is a partial top view of a first embodiment of a top cover.
Figure 3:
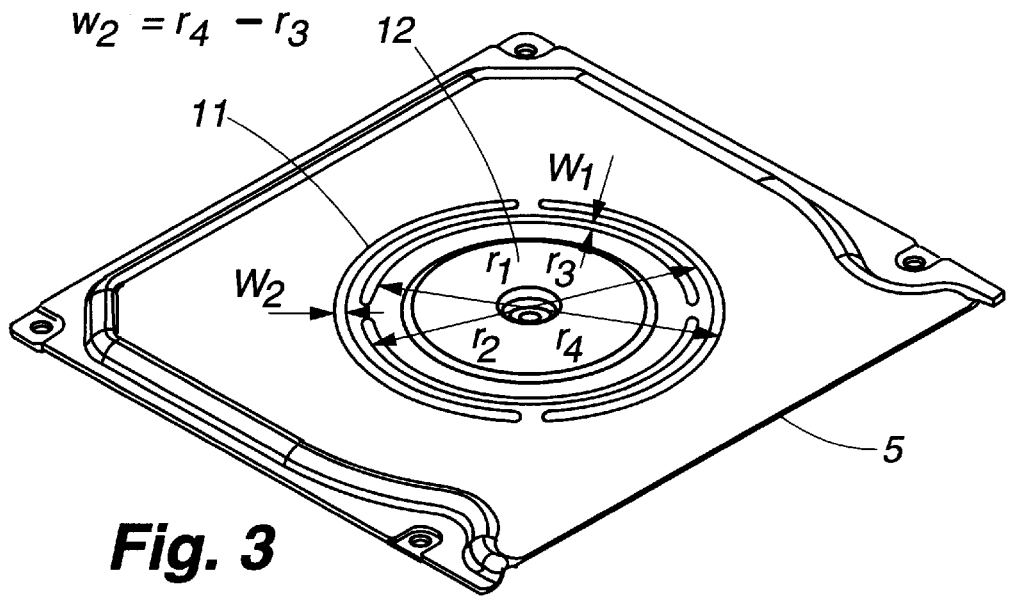
FIG. 3 is a perspective view of the first embodiment of a top cover.

As shown in FIG. 1, disk drive 2 includes a housing 3 containing a spindle 4 secured between a top cover 5 and a bottom base plate 6. A hub 7 is mounted on the spindle 4 and supports disks 8 for rotation about an axis 9. A head assembly (not shown) is provided for reading information from and writing information onto disks 8 as they rotate with the hub 7. The top and bottom of shaft 10 are rigidly mounted to the top cover 5 and bottom baseplate 6, respectively, by screws or the like. Cartridge bearing assemblies support the hub 7 on the shaft 10 to permit rotation of the hub 7 about the shaft 10.

As shown in FIGS. 1–4, a circular 2-slot arrangement 11 is manufactured into the top cover 5. The circular 2-slot arrangement 11 can be machined or stamped as desired, and is positioned around a center raised area 12 which clears the disk clamp 13. In the preferred embodiment, the inner slot 14 on cover 5 is broken into halves separated by two closed areas 15, 180 degrees apart, which can vary in size, but are about 0.120 inches in length. The inner slot 14 on cover 5 has a width $w_1$ that is about 0.100 inches with an inner radius $r_1$ of about 0.781 inches and outer radius $r_2$ of about 0.881 inches measured from the spindle axis 9. The outer slot 16 on cover 5 has two halves separated by two closed areas 17, 180 degrees apart, and are about 0.120 inches in length. The outer slot 16 on cover 5, a width $w_2$ that is about 0.100 inches in length, with an inner radius $r_3$ of about 0.969 inches and an outer radius $r_4$ of about 1.069 inches measured from the spindle axis 9. The inner slot 14 closed space 15 is typically positioned 90 degrees from the outer slot 16 and closed space 17, but the relative position of the inner and outer closed spaces may vary. Depending upon the application, there exists a plurality of positions of the inner slot 14 and the outer slot 16 relative to the axis 9 of the spindle shaft 10. In the preferred embodiment, both inner slot 14, and the outer slot 16 are concentrically centered with respect to the axis 9 of the spindle shaft 10.

Figure 5:
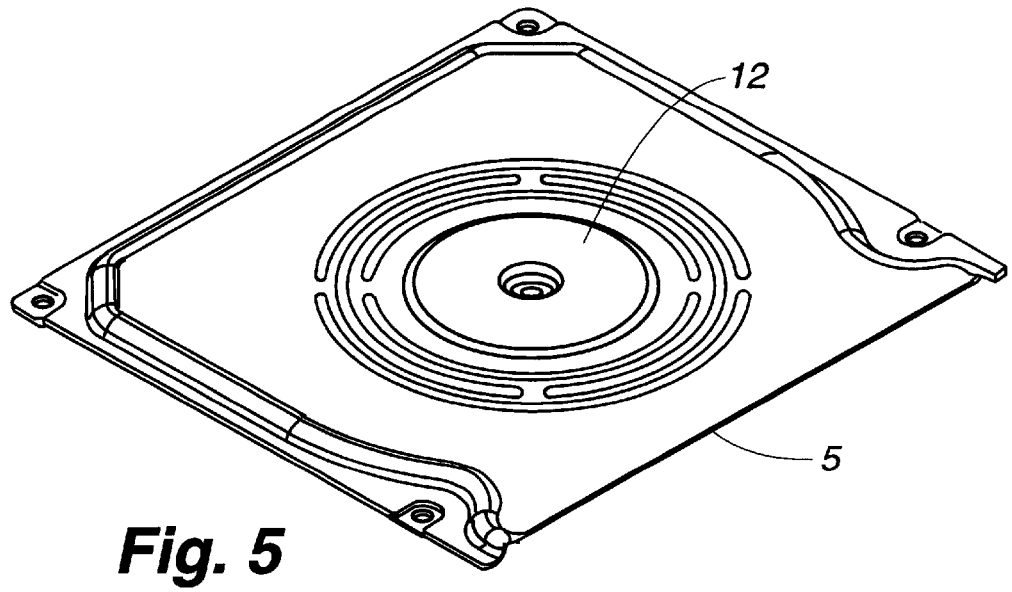
FIG. 5 is a perspective view of a second embodiment of a top cover.

A person of skill in the art will appreciate, upon reading this disclosure, that the number of slots and their relative sizing, spacing and configuration may vary. For example, a circular slot may comprise more than two arcuate segments and the spacing between segments may vary. The relative width of the segments may vary and the number of overall circular slots may be more than two. FIG. 5 discloses an embodiment with three concentrically arranged rows of slots.

Figure 6:
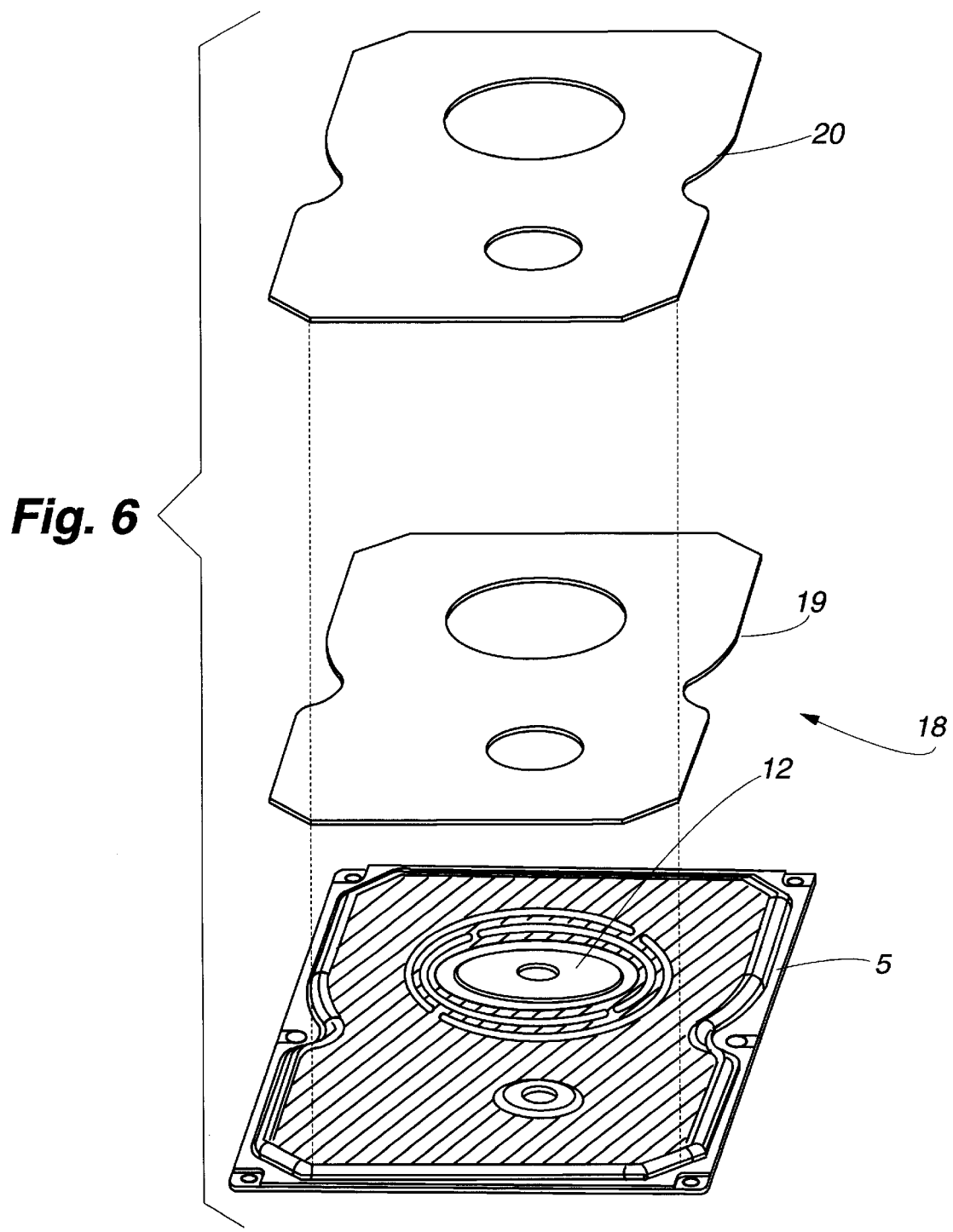
FIG. 6 is an isometric view of the constrained-layer damper and first embodiment of the top cover.

As shown in FIG. 6, an exploded view of the cover damper 18 consists of the top cover 5, the constrained-layer 19, and the cover sheet 20 positioned on top of the constrained-layer 19. The constrained-layer damper 19 consists of an adhesive material that preferably varies from about 0.002 to about 0.005 inches thick. The cover sheet 20, of preferably about 0.020 inches thick is positioned on top of the adhesive for protection. In the preferred embodiment, the constrained-layer damper adhesive can either be Avery Adhesive or 3M ISD-112, which is an acrylic acoustic material with a silicone reduced Mylar liner. The Avery Adhesive is manufactured by Avery Denison Co., Painsville, Ohio. The 3M ISD-112 is manufactured by 3M, Minneapolis, Minn. The disk drive top cover 5 can be selected from the group consisting of plastic, aluminum or stainless steel. The cover sheet 20 is positioned to protect the adhesive and may be selected from the group consisting of plastic, aluminum or stainless steel.

The results from tests comparing first and second slotted embodiments of the present invention to a standard solid cover is set forth in the table reproduced as FIG. 9. The drives tested utilized a circular 2-slot configuration, with either an Avery Adhesive constrained-ayer damper or a 3M ISD-112 constrained-layer damper, and a 3-slot configuration with an Avery Adhesive constrained-layer damper. All test results show a reduction in spindle rocking mode peak amplitude and a reduction or shifting of frequency. From these results, it can be concluded that cover damper 18, comprising the top cover 5, the constrained layer damper 19 and cover sheet 20, is effective in damping the vibration of the spindle to reduce the effects of the natural rocking mode and any interaction of the natural rocking mode with the bearing defect frequency. The implementation as shown in FIGS. 1 and 5 attained more than a 50 percent reduction in spindle rocking mode peak amplitude.

Figure 10:
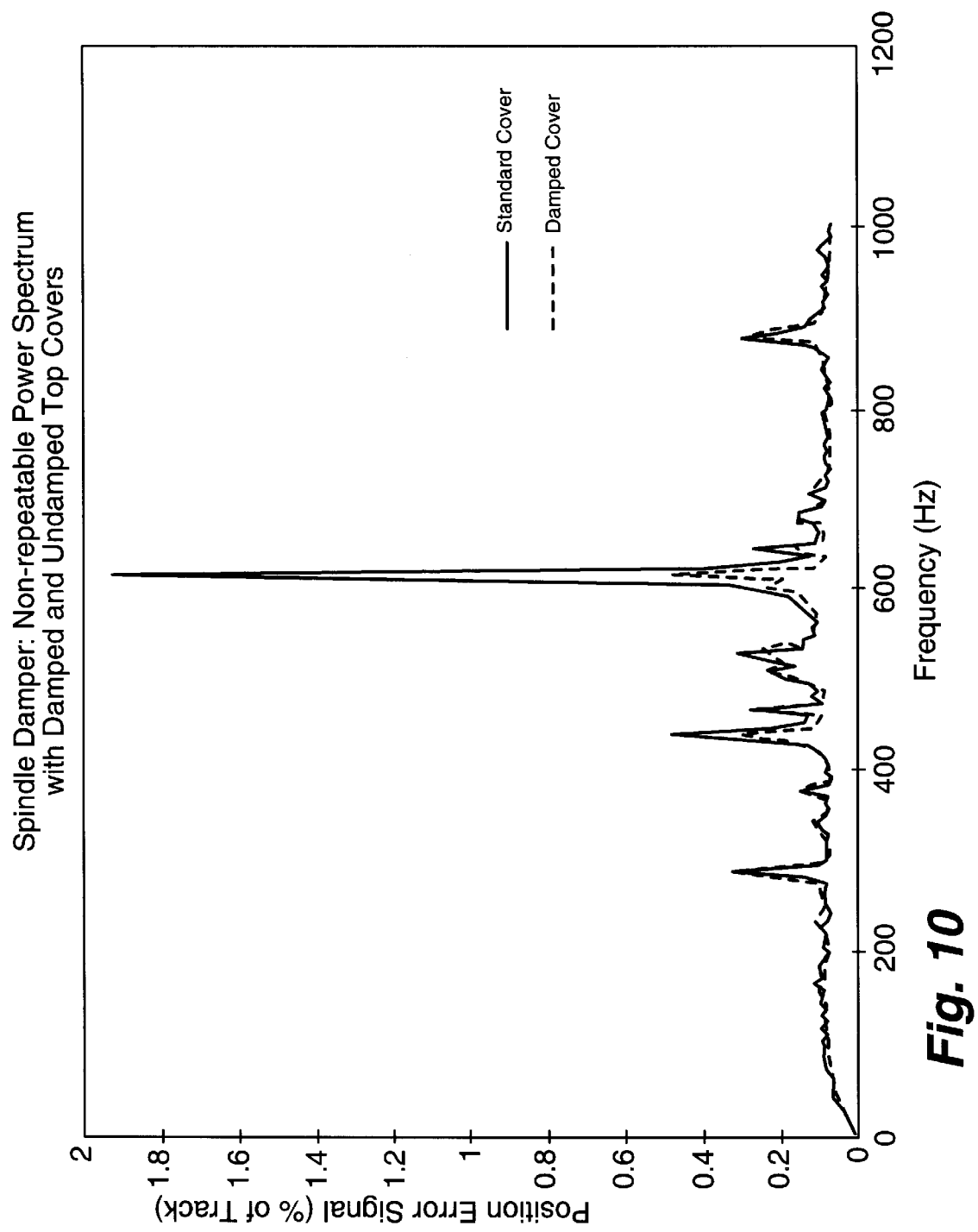
FIG. 10 is a graph of position error signal versus frequency for a dampened spindle utilizing a 10-ball motor and top cover having a 2-slot configuration and an Avery Adhesive constrained-layer damper.

As shown in FIG. 10, a graph comparing the position error signal of a disk drive containing a solid cover or a 2-slot cover as shown in FIGS. 1–4, and further comprising a 10-ball motor operating at 5400 revolutions per minute, the embodiment of FIGS. 1–4 provides a 74 percent reduction of position error signal (PES) based upon percentage of track measurements, compared to a solid cover.

Figure 7:
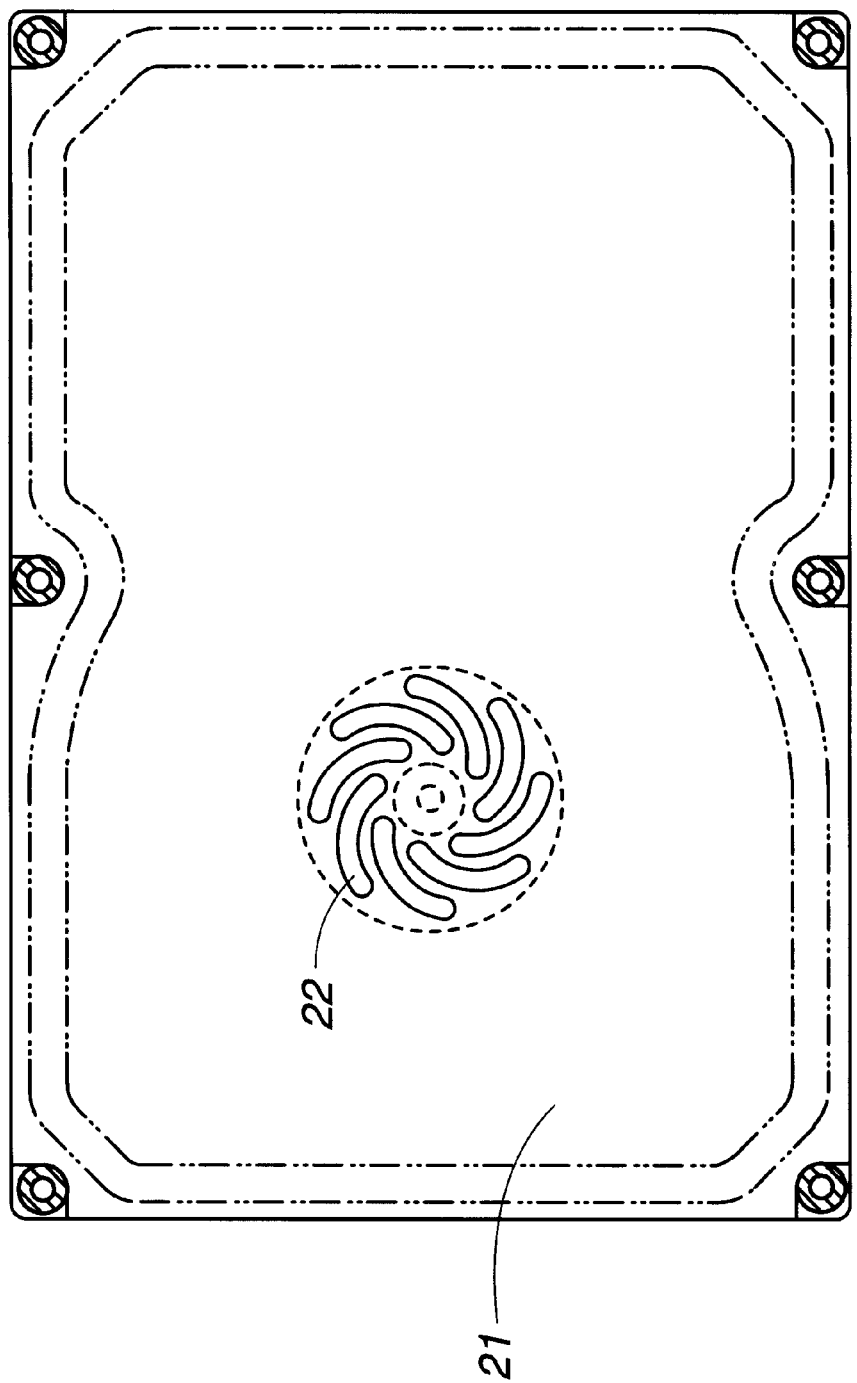
FIG. 7 is a top view of a disk drive cover spiral slot configuration.
Figure 8:
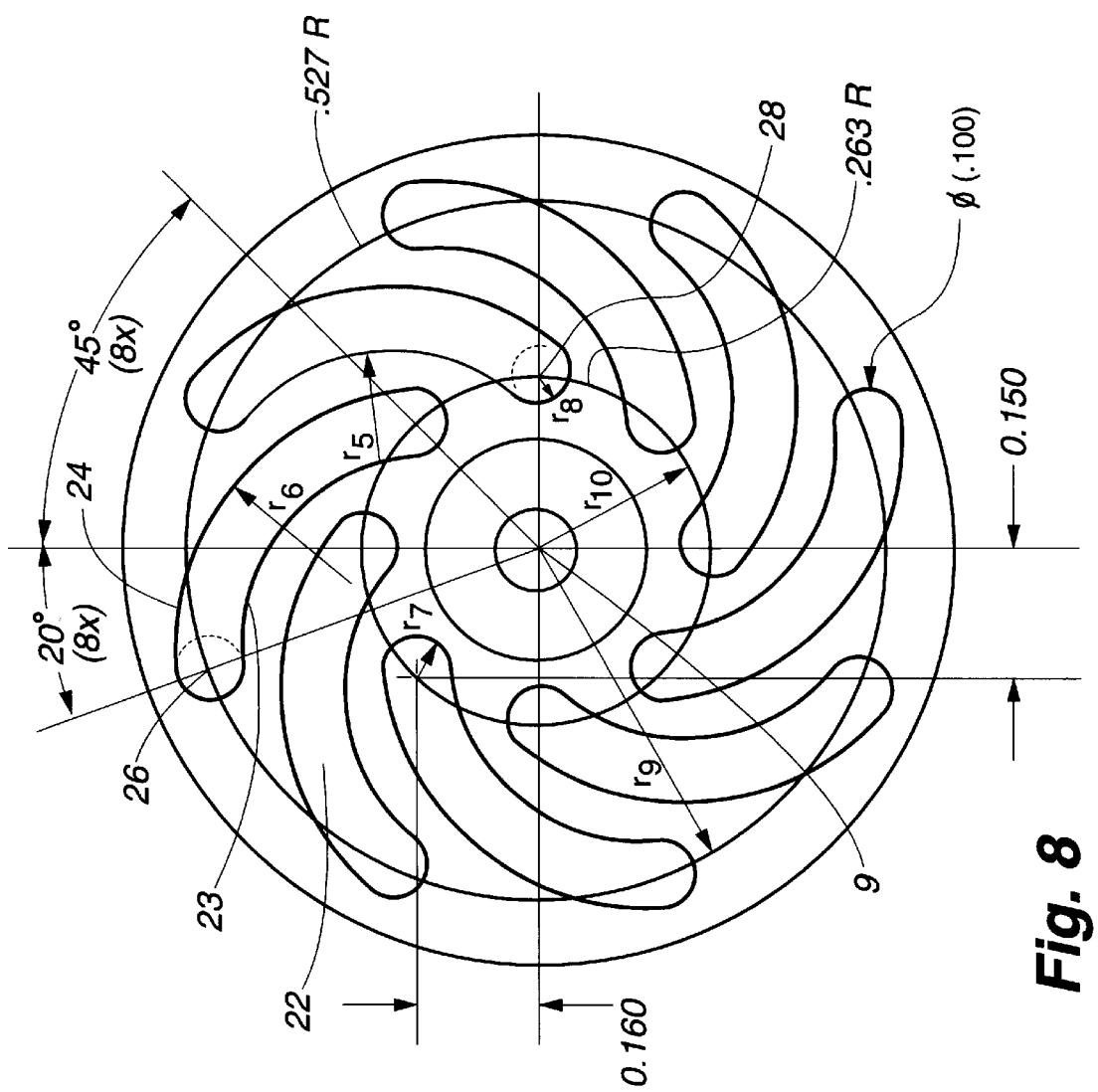
FIG. 8 is an enlarged top view of a spiral slot configuration.

FIGS. 7 and 8 depict another embodiment of the principles of the present invention comprising a series of spiral slots machined or stamped into the disk drive top cover. The top cover 21 comprises a plurality of equally spaced spiral slots 22 oriented clockwise. Although not shown, the top cover 21 may comprise a plurality of equally spaced spiral slots 22 oriented counter-clockwise. FIG. 8 shows a spiral slot 22 configuration consisting of 8 slots oriented clockwise. The spiral slots 22 are arranged in 45 degree increments. The inside edge 23 of the spiral slot 22 has a radius $r_5$ of about 0.287 inches and the outside edge 24 of the spiral slot 22 has a radius $r_6$ of about 0.387 inches. The circular end 26 of spiral slot 22 has a radius $r_7$ of about 0.050 inches, and the circular end 28 of spiral slot 22 has a radius $r_8$ of about 0.050 inches. The outside radius $r_9$ of the circular end 26 of the spiral slot 22 has a radius of about 0.527 inches from the axis 9. The inside radius $r_{10}$ of the circular end 28 of the spiral slot 22 has a radius of about 0.263 inches from the axis 9. The space between the center of circular end 26 and the center of circular end 28 is an angle of about 65 degrees. There exists a plurality of different sizes for the inside edge 23, outside edge 24, outside radius 25, circular end 26, inside radius 27, and circular end 28, depending on the required application.

The spiral shaped slots also change the top cover from a homogeneous stiff in-plane material, to a series of relatively weaker beams which flex more easily yet contain no directional stiffness. This configuration changes the stiffness (e.g., spring rate) of the disk drive top cover compared to a solid cover. The spiral shape enhances in-plane flexing of the top cover in the area of the spindle. The spiral slots may be oriented either clockwise or counter-clockwise. By modifying the length, angle and width of the spiral slots, varying reductions of in-plane stiffiess are available. While this design provides some damping, it primarily alters or shifts the static rocking mode frequency to reduce the likelihood of interference or overlap between the static rocking mode frequency and the bearing defect frequency. An embodiment of this design has been shown to have attained about a 19 Hz reduction or shift in spindle static rocking frequency compared to the same drive utilizing a solid cover. This change does not weaken the structure of the disk drive cover to the point where it would be expected to impact external shock and vibration performance.

While the invention has been particularly shown and described with reference to three embodiments thereof, it will be understood by those skilled in the art that various other changes in the form and details may be made therein without departing from the spirit and scope of the invention. The present disclosure is merely illustrative, the invention encompassing all variations thereof.

What is claimed is:

1. A disk drive comprising:
    a disk housing having a top cover and a base;
    a spindle shaft disposed between said top cover and said base;
    a rotatable hub in association with said spindle shaft and supporting at least one disk;
    a spindle motor in association with said hub to rotate said hub and said at least one disk;
    a plurality of slots disposed in said top cover proximate said spindle shaft to change the spring rate of the top cover proximate to the axis of said spindle shaft, wherein any imaginary line that extends to and is between the axis of the spindle shaft and a perimeter of the top cover and is co-planar with the slots intersects at least one of the slots; and
    a constrained-layer damper disposed on the outside of said top cover.

2. The disk drive of claim 1 wherein said plurality of slots contains a pair of slots concentrically disposed relative to the axis of said spindle shaft for resonance tuning around the position of said spindle shaft.

3. The disk drive of claim 2 wherein said plurality of slots contains a third slot concentrically disposed relative to said pair of slots for resonance tuning around the position of said spindle shaft.

4. The disk drive of claim 1 wherein said plurality of slots contains a plurality of arcuate slots having a first end and a second end, said arcuate slots extending outwardly from a first location having a first radius relative to said axis of said spindle shaft and terminating at a second location having a second radius relative to said axis of said spindle shaft, for resonance tuning around the position of said spindle shaft.

5. A disk drive comprising:
    a disk housing having a cover plate, said cover plate having a first surface area and a second surface area, wherein said first surface area is offset from, parallel to, below and surrounds said second surface area;
    a spindle shaft mounted to said second surface area;
    a rotatable hub disposed on said spindle shaft and supporting at least one disk;
    a spindle motor in association with said hub to rotate said hub and said at least one disk; and
    a plurality of slots disposed in said first surface area of said cover plate, to change the spring rate of the cover plate proximate to the axis of said spindle shaft.

6. The disk drive of claim 5, wherein said cover plate further comprises a constrained-layer damper disposed on the outside of said cover plate and over said first surface area.

7. The disk drive of claim 5, wherein said plurality of slots contains a pair of slots concentrically disposed relative to the axis of said spindle shaft for resonance tuning around the position of said spindle shaft.

8. The disk drive of claim 7, wherein said plurality of slots contains a third slot concentrically disposed relative to said pair of slots for resonance tuning around the position of said spindle shaft.

9. The disk drive of claim 5, wherein said plurality of slots contains a plurality of arcuate slots having a first end and a second end, said arcuate slots extending outwardly from a first location having a first radius relative to said axis of said spindle shaft and terminating at a second location having a second radius relative to said axis of said spindle shaft, for resonance tuning around the position of said spindle shaft.

10. A disk drive comprising:
    a disk housing having a top cover and a base;
    a spindle shaft disposed between the top cover and the base;
    a disk that stores information and rotates about an axis of the spindle shaft; and
    a plurality of through slots in the top cover, wherein the slots are proximate to the spindle shaft and reduce the stiffness of the top cover proximate to the axis of said spindle shaft, and any imaginary line that extends to and is between the axis of the spindle shaft and a perimeter of the top cover and is co-planar with the slots intersects at least one of the slots.

11. The disk drive of claim 10 wherein the slots have substantially similar shapes.

12. The disk drive of claim 11 wherein the slots at a given radius from the axis of the spindle shaft have essentially identical circumferential shapes about the axis of the spindle shaft.

13. The disk drive of claim 11 wherein the slots at a first radius from the axis of the spindle shaft have a first length between their distal ends, the slots at a second radius from the axis of the spindle shaft have a second length between their distal ends, the first radius is less than the second radius, and the first length is less than the second length.

14. The disk drive of claim 13 wherein the slots at the first and second radii have essentially identical widths.

15. The disk drive of claim 11 wherein the slots have a first distal end at a first radius and a second distal end at a second radius, and the first radius is less than the second radius.

16. The disk drive of claim 15 wherein the slots have essentially identical arcuate shapes.

17. The disk drive of claim 11 wherein the slots have essentially identical lengths between their distal ends.

18. The disk drive of claim 11 wherein the slots have essentially identical widths between their non-distal ends.

19. The disk drive of claim 18 wherein the widths are about 0.100 inches.

20. The disk drive of claim 10 wherein none of the slots surround any components beneath the top cover in the disk drive.

21. The disk drive of claim 10 wherein the slots change the top cover from a homogeneous stiff in-plane material to a series of relatively weaker beams.

22. The disk drive of claim 21 wherein the relatively weaker beams contain no directional stiffness.

23. The disk drive of claim 10 wherein the slots have essentially identical circumferential shapes and are circumferentially centered with respect to the axis of the spindle shaft.

24. The disk drive of claim 23 wherein the slots consist of pairs of slots, each of the pairs of slots is at a different radius from the axis of the spindle shaft, each of the pairs of slots surround a majority of the axis of the spindle shaft, and each of the pairs of slots are separated from one another at their distal ends by a single distance.

25. The disk drive of claim 23 wherein the slots have essentially identical widths between their non-distal ends.

26. The disk drive of claim 10 wherein the slots have equally spaced spiral shapes.

27. The disk drive of claim 26 wherein the slots are disposed symmetrically about the axis of the spindle shaft.

28. The disk drive of claim 26 wherein the slots have essentially identical shapes and sizes.

29. The disk drive of claim 10 wherein any imaginary line that extends to and is between the axis of the spindle shaft and a perimeter of the top cover and is co-planar with the slots intersects at most three of the slots.

30. The disk drive of claim 10 including a constrained-layer damper disposed on the outside of the top cover.

31. The disk drive of claim 30 wherein the constrained-layer damper overlies at least some of the slots.

32. The disk drive of claim 31 wherein the constrained-layer damper overlies the slots.

33. The disk drive of claim 32 wherein the constrained-layer damper does not overlie the axis of the spindle shaft.

34. The disk drive of claim 32 wherein the constrained-layer damper is a single continuous sheet containing a plurality of through-holes.

35. The disk drive of claim 30 wherein the top cover includes a first surface area offset from and parallel to a second surface area, and the constrained-layer damper overlies the first surface area but not the second surface area.

36. The disk drive of claim 35 wherein the constrained-layer damper contacts the first surface area but not the second surface area.

37. The disk drive of claim 35 wherein the first surface area is below the second surface area.

38. The disk drive of claim 35 wherein the first surface area surrounds the second surface area.

39. The disk drive of claim 30 wherein the constrained-layer damper consists of an adhesive material.

40. The disk drive of claim 39 wherein the adhesive material varies from about 0.002 to about 0.005 inches thick.

41. The disk drive of claim 39 wherein the adhesive material is positioned between and adheres to the top cover and a cover sheet.

42. The disk drive of claim 30 including a cover sheet that overlies the constrained-layer damper.

43. The disk drive of claim 42 wherein the constrained-layer damper is sandwiched between and contacts the top cover and the cover sheet.

44. The disk drive of claim 42 wherein the top cover, the constrained-layer damper and the cover sheet in combination provide a substantial reduction in spindle rocking mode peak amplitude of the disk drive.

45. The disk drive of claim 44 wherein the top cover, the constrained-layer damper and the cover sheet in combination reduce the spindle rocking mode peak amplitude of the disk drive by more than 50 percent.

46. The disk drive of claim 42 wherein the top cover, the constrained-layer damper and the cover sheet in combination provide a substantial reduction in the spindle rocking frequency of the disk drive.

47. The disk drive of claim 46 wherein the top cover, the constrained-layer damper and the cover sheet in combination reduce the spindle rocking frequency of the disk drive by about 19 Hz.

48. The disk drive of claim 42 wherein the top cover, the constrained-layer damper and the cover sheet in combination alter the spindle rocking frequency of the disk drive so that the spindle rocking frequency no longer interacts with a bearing defect frequency of the disk drive.

49. The disk drive of claim 42 wherein the top cover, the constrained-layer damper and the cover sheet in combination allow increased lateral motion of the spindle shaft by facilitating movement in the plane of the top cover.

50. A disk drive comprising:
a disk housing having a top cover and a base;
a spindle shaft disposed between the top cover and the base;
a disk that stores information and rotates about an axis of the spindle shaft;
a plurality of slots in the top cover, wherein the slots are proximate to the spindle shaft and reduce the stiffness of the top cover proximate to the axis of said spindle shaft, and any imaginary line that extends to and is between the axis of the spindle shaft and a perimeter of the top cover and is co-planar with the slots intersects at least one of die slots; and
a constrained-layer damper that is adhesively attached to the outside of the top cover and overlies the slots.

51. The disk drive of claim 50 wherein the slots at a given radius from the axis of the spindle shaft have essentially identical shapes and sizes.

52. The disk drive of claim 50 wherein none of the slots surround any components beneath the top cover in the disk drive.

53. The disk drive of claim 50 wherein the constrained-layer damper does not overlie the axis of the spindle shaft.

54. The disk drive of claim 50 including a cover sheet adhesively attached to the constrained-layer damper.

55. A disk drive comprising:

a disk housing having a top cover and a base;

a spindle shaft disposed between the top cover and the base;

a disk that stores information and rotates about an axis of the spindle shaft;

a plurality of slots in the top cover, wherein the slots are proximate to the spindle shaft and reduce the stiffness of the top cover proximate to the axis of said spindle shaft, any of the slots at a given radius from the axis of the spindle shaft have essentially identical shapes and sizes, and any imaginary line that extends to and is between the axis of the spindle shaft and a perimeter of the top cover and is co-planar with the slots intersects at least one of the slots;

a constrained-layer damper that is adhesively attached to the outside of the top cover, overlies the slots, and does not overlie the axis of the spindle shaft; and a cover sheet that is adhesively attached to the constrained-layer damper such that the constrained-layer damper is sandwiched between the top cover and the cover sheet.

* * * * *